United States Patent
Wildgrube et al.

(10) Patent No.: US 6,487,655 B1
(45) Date of Patent: Nov. 26, 2002

(54) COMPUTER SYSTEM FORMED WITH A PROCESSOR AND A SYSTEM BOARD PROVIDED WITH COMPLEMENTARY INITIALIZATION SUPPORT

(75) Inventors: Frank L. Wildgrube, Hillsboro; Stephen S. Pawlowski, Beaverton, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/302,163

(22) Filed: Apr. 29, 1999

(51) Int. Cl.[7] .............................................. G06F 9/445
(52) U.S. Cl. ........................................................ 713/2
(58) Field of Search ........................ 713/1, 2; 709/220, 709/222; 710/8, 10

(56) References Cited

U.S. PATENT DOCUMENTS 4,622,633 A * 11/1986 Ceccon et al. .................. 713/1
5,978,912 A * 11/1999 Rakavy et al. .................. 713/2
6,199,159 B1 * 3/2001 Fish ................................ 713/2

* cited by examiner

Primary Examiner—Thomas M. Heckler
(74) Attorney, Agent, or Firm—Blakely, Sokoloff, Taylor & Zafman LLP

(57) ABSTRACT

A computer system is provided with a processor and a system board. The processor includes a processor core, at least one other non-processor core electronic component and a first non-volatile memory device. Stored inside the first non-volatile memory includes first programming instructions that provide initialization support for the at least one other non-processor core electronic component of the processor. The system board includes at least one non-processor electronic component and a second non-volatile memory device. Stored inside the second non-volatile memory device includes second programming instructions that provide initialization support for the at least one non-processor electronic component of the system board. Both the first and the second programming instructions further support a cooperative initialization protocol under which the first and second programming instructions cooperate with each other to initialize the computer system at power-on/reset.

29 Claims, 4 Drawing Sheets

| INDEX | PROCESS |
|---|---|
| 0 | MODULE ID |
| 1 | VIDEO CONTROLLER BIOS |
| 2 | VIDEO CONTROLLER DRIVERS |
| 3-4 | AVAILABLE |
| 5 | MCH DEFAULTS |
| 6 | INSTALL PROCESSOR UPDATE |
| 7 | DISABLE CACHE |
| 8 | ENABLE CACHE |
| 9 | DETECT MEMORY |
| 10 | ENABLE MEMORY ERROR CHECKING |
| 11 | PROCESS MEMORY ERROR |
| 12 | GET MEMORY MAP |

COMPUTER SYSTEM FORMED WITH A PROCESSOR AND A SYSTEM BOARD PROVIDED WITH COMPLEMENTARY INITIALIZATION SUPPORT

BACKGROUND OF THE INVENTION

1. Field of the Invention

The present invention relates to the field of computer systems. More specifically, the present invention relates to a distributed approach to providing initialization support for a computer system.

2. Background Information

Most computer systems are provided with a set of instructions to initialize the computer systems at power-on/reset. The initialization tasks typically include a power-on self-test (POST) that tests certain basic hardware to ensure these basic hardware are present and functioning properly, detection and configuration of the system memory including the memory controller, detection and configuration of the video controller, and so forth. These instructions are typically provided as an integral part of the computer system's basic input/output system (BIOS).

Since at power-on/reset, the system memory is not configured, thus the BIOS including the initialization instructions, is typically disposed in a read-only-memory (ROM) device, such as flash memory, of the system board, and executed in place at power-on/reset. To make this in place execution possible at power-on/reset, the ROM is associated with a predetermined address range, and enabled at power on/reset. All "address handling controllers", such as a bus bridge, that are in the access path of the ROM are designed to understand and recognize this association. Furthermore, the processor is designed to start execution at power-on/reset at a predetermined address that is within this address range.

This prior art approach to providing the initialization instructions in a ROM of the system board suffers from at least one disadvantage. That is, the different processors and associated memory controllers that can be used with the system board must be predetermined, so that the logic for their support can be properly included in the initialization instructions. Otherwise, these initialization instructions must be updated in order for the system board to be able to support a new family of processors and associated memory controllers that become available after the system board. As those skilled in the art will appreciate that the process of updating BIOS is user unfriendly and error prone.

Thus, an improved approach to providing initialization support for a computer system is desired.

SUMMARY OF THE INVENTION

A computer system is provided with a processor and a system board. The processor includes a processor core, at least one other non-processor core electronic component and a first non-volatile memory device. Stored inside the first non-volatile memory includes first programming instructions that provide initialization support for the at least one other non-processor core electronic component of the processor. The system board includes at least one non-processor electronic component and a second non-volatile memory device. Stored inside the second non-volatile memory device includes second programming instructions that provide initialization support for the at least one non-processor electronic component of the system board. Both the first and the second programming instructions further support a cooperative initialization protocol under which the first and second programming instructions cooperate with each other to initialize the computer system at power-on/reset.

BRIEF DESCRIPTION OF DRAWINGS

The present invention will be described by way of exemplary embodiments, but not limitations, illustrated in the accompanying drawings in which like references denote similar element and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention.

Parts of the description will be presented using terminology commonly employed by those skilled in the art to convey the substance of their work to others skilled in the art, such as controllers, flash memory, and so forth. Also, parts of the description will also be presented in terms of operations performed through the execution of programming instructions, using terms such as programming a controller, transferring execution control, and so on. As well understood by those skilled in the art, these operations take the form of electrical, magnetic, or optical signals capable of being stored, transferred, combined, and otherwise manipulated through electrical components.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1A:
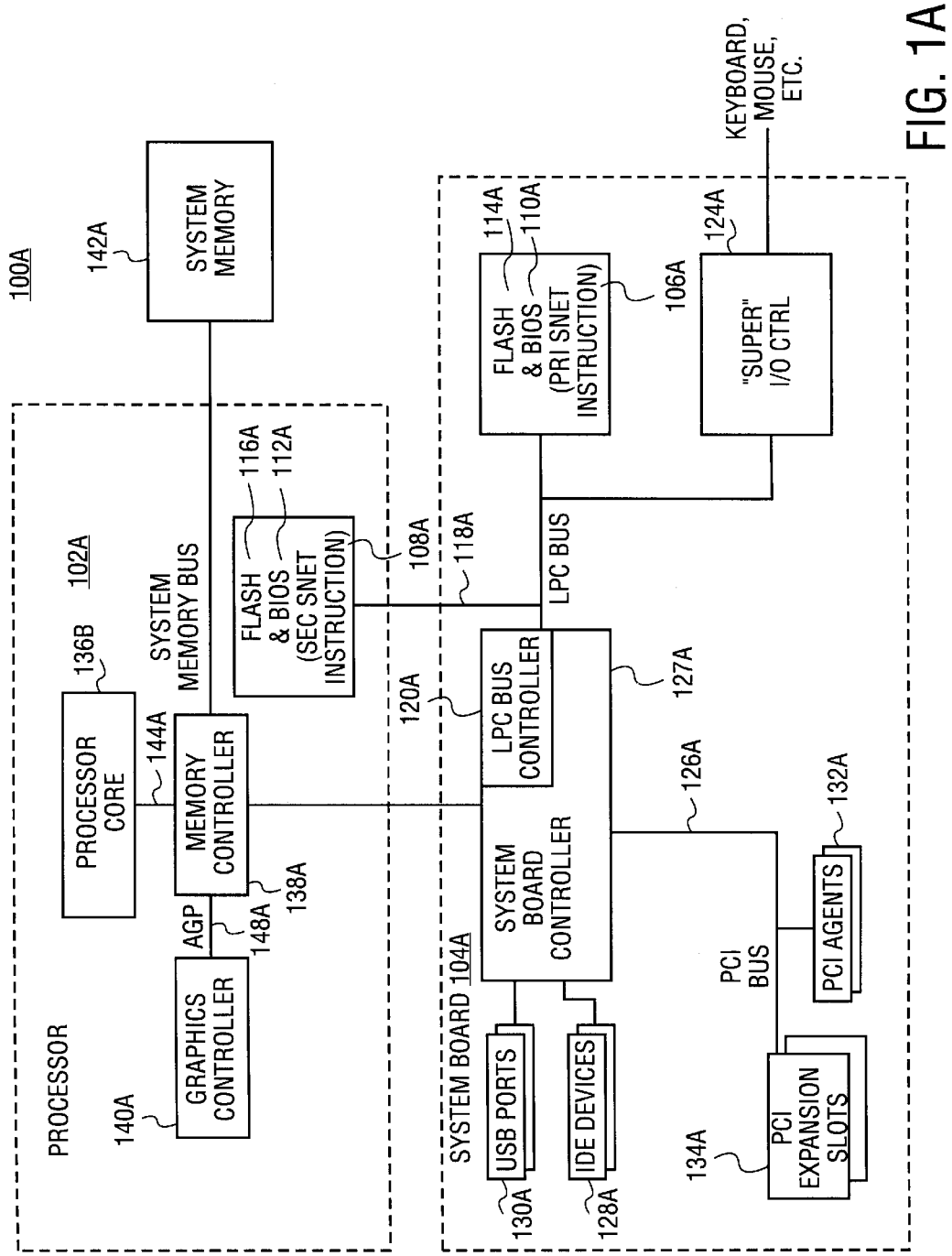
FIGS. 1a–1b illustrate two example computer systems incorporated with the present invention in accordance with two embodiments.
Figure 1B:
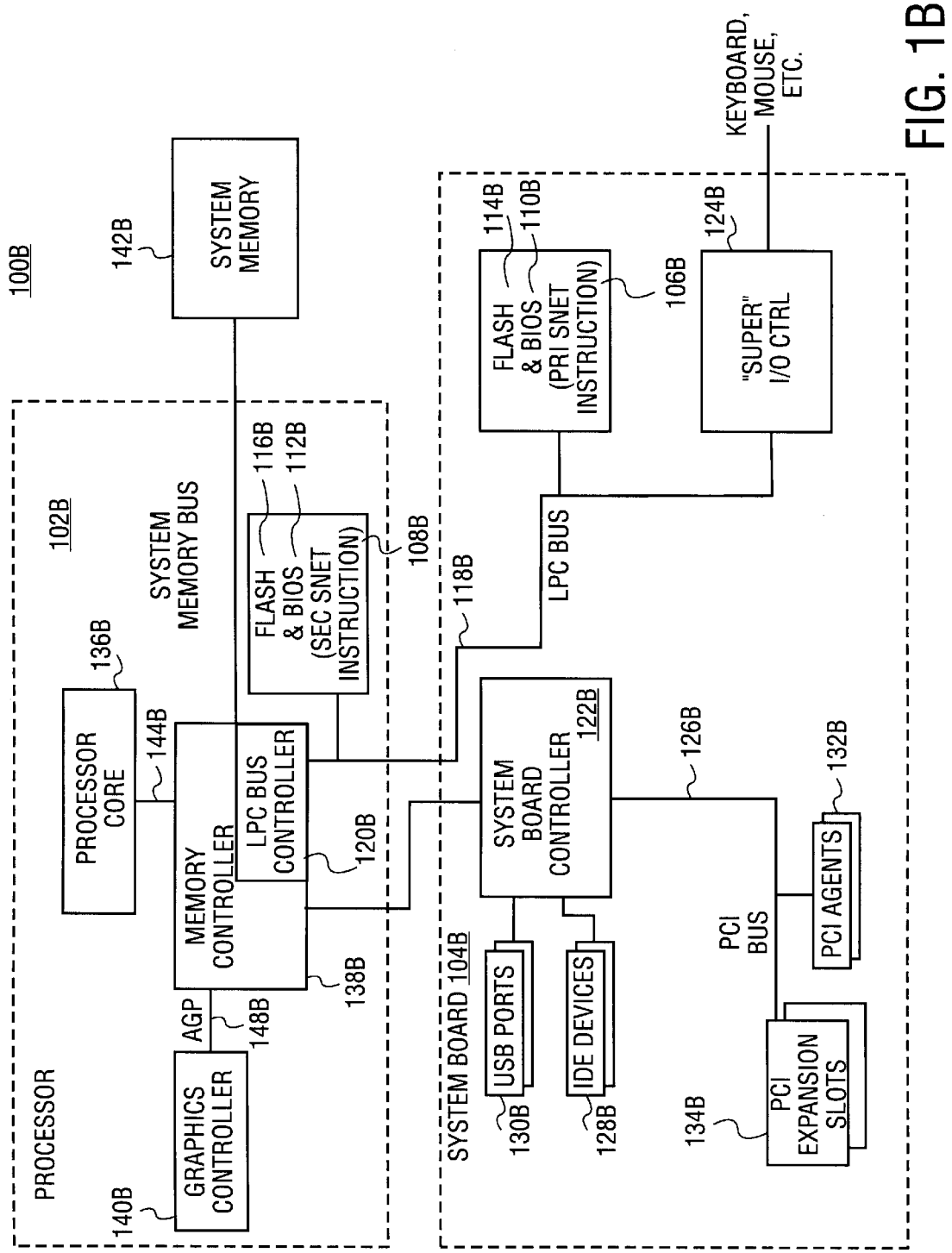

Referring now to FIGS. 1a–1b, wherein two example computer systems incorporated with the present invention in accordance with two embodiments are shown. As illustrated in FIG. 1a, example computer system 100a is advantageously provided with processor 102a and system board 104a, which have been correspondingly provided with complementary secondary and primary initialization instructions 108a and 106a, in accordance with the present invention. As will be described in more details below, primary initialization instructions 106a provide initialization support for electronic components of system board 104a, and secondary initialization instruction 108a provide initialization support for electronic components of processor 102a. Additionally, both initialization instructions 106a–108a complementarily support a cooperative initialization protocol of the present invention. As a result, processors and system boards that are so equipped may be employed together to form a computer system without requiring priori knowledge of the processor at the time the system board is designed, and vice versa.

Continuing to refer to FIG. 1a, for the illustrated embodiment, primary and secondary initialization instructions 106a and 108a are correspondingly provided as an integral part of BIOS 110a and 112a, which are correspondingly stored in flash memory 114a and 116a. In alternate embodiments, other non-volatile memory devices known in the art, such as EEPROM, may also be used in lieu of flash memory. Additionally, also stored inside flash memory 114a and 116a are service directories (not shown) through which various device specific initialization support may be located. Furthermore, each of flash memory 114a and 116a is also provided with an identification circuitry (also not shown) to generate an identifier to uniquely identify the flash memory on the bus to which the flash memory is attached. More specifically, the identification circuitry of flash memory 114a (where the primary initialization instructions are stored) are strapped to generate a device identifier "00" for flash memory 114a, whereas the identification circuitry of flash memory 116a (where the secondary initialization instructions are stored) are strapped to generate a device identifier "01" for flash memory 116a. Both, the service directory and the identification circuitry will be further described later with references to FIGS. 2–3.

As shown, for the illustrated embodiment, flash memory 114a and 116a are attached to a "low pin count" (LPC) bus 118a, which in turn couples both flash memory devices to LPC bus controller 120a, disposed inside system board controller 122a. LPC bus 118a is advantageously employed to reduce the circuitry requirement on flash memory 114a and 116a, as the bus transactions required to effectuate the initialization tasks are relatively straight forward. The full functionality of a high performance bus, such as the Peripheral Component Interconnect (PCI) bus, is not needed to facilitate these transactions. The bus protocol may be any one of a number of basic bus protocols known in the art. In alternate embodiments, LPC bus controller 120a may be separately disposed apart from system board controller 122a.

For the illustrated embodiment, LPC bus 118a is also used to support other simple I/O devices, such as keyboard and mouse, through "super" I/O controller 124a. In alternate embodiments, LPC bus 118a may be a "private" bus dedicated to the exclusive use by flash memory 114a–116a instead.

For the illustrated embodiment, system board controller 122a also controls PCI bus 126a, integrated device electronics (IDE) devices 128a and universal serial bus (USB) ports 130a. Attached to PCI bus 126a are PCI agents 132a and PCI expansion slots 134a (for PCI expansion cards). These devices are known, and will not be further described.

Over in the processor side, in addition to flash memory 116a, for the illustrated embodiment, processor 102a further includes processor core 136a, memory controller 138a and graphics controller 140a. Memory controller 138a is coupled to processor core 136a, system memory 142a and graphics controller 140a through processor bus 144a, memory bus 146a and accelerated graphics port (AGP) 148a respectively. These elements are also known in the art, and will not be further described.

As in the prior art, flash memory 114a is associated with a predetermined address range, and enabled at power-on/reset. Both memory controller 138a and system memory controller 112a are designed to understand and recognize the association. Furthermore, processor core 136a is designed to start execution at power-on/reset at a predetermined address that is within this address range. However, flash memory 116a is not associated with any predetermined address range, nor automatically enabled at power-on/reset.

The manner in which primary and secondary initialization instructions 106a–108a cooperate under the present invention to jointly initialize computer system 100a at power-on/reset, including the employment of the service directories and the device identifiers, will be further described later, after the alternate embodiment of FIG. 1b, the service directory and the identification circuit have been described.

Referring now to FIG. 1b, wherein another example computer system incorporated with the teachings of the present invention in accordance with an alternate embodiment is shown. As illustrated, similar to the embodiment of FIG. 1a, example computer system 100b is advantageously provided with processor 102b and system board 104b, which have been correspondingly provided with complementary initialization instructions 108b and 106b, in accordance with the present invention. However, unlike the embodiment of FIG. 1a, the initialization instructions provided to processor 102b are the primary initialization instructions, while the initialization instructions provided to system board 104b are the secondary initialization instructions instead. Primary initialization instructions 108b provide initialization support for electronic components of processor 102b, and secondary initialization instructions 106b provide initialization support for electronic components of system board 104b. Additionally, both initialization instructions 106b–108b complementarily support the cooperative initialization protocol of the present invention. As a result, processors and system boards that are so equipped may also be employed together to form a computer system without requiring priori knowledge of the processor at the time the system board is designed, and vice versa.

Continuing to refer to FIG. 1b, for the illustrated embodiment, primary and secondary initialization instructions 108b and 106b are correspondingly provided as an integral part of BIOS 112b and 110b, which are correspondingly stored in flash memory 116b and 114b instead. Similar to the embodiment of FIG. 1a, also stored in flash memory 116b and 114b are service directories (not shown) through which various device specific initialization services may be located. Furthermore, each of flash memory 116b and 114b is also provided with an identification circuitry (not shown) to generate an identifier to uniquely identify the flash memory on the bus to the flash memory is attached. However, the identification circuitry of flash memory 116b (where the primary initialization instructions are stored) are strapped to generate a device identifier "00" for flash memory 116b, whereas the identification circuitry of flash memory 114b (where the secondary initialization instructions are stored) are strapped to generate a device identifier "01" for flash memory 114b. While flash memory 116b and 114b are also attached to a "low pin count" (LPC) bus 118b, bus 118b couples both flash memory devices to LPC bus controller 120b, which is disposed inside memory controller 138b instead.

Otherwise, as the earlier described embodiment, processor 102b includes processor core 136b, memory controller 138b and graphics controller 140b; and these elements are coupled to each other and system memory 142b through processor bus 144b, memory bus 146b and accelerated graphics port (AGP) 148b. Likewise, over in the system board side, system board controller 122b also controls PCI bus 126b, integrated device electronics (IDE) devices 128b and universal serial bus (USB) ports 130b; and attached to PCI bus 126b are PCI agents 132b and PCI expansion slots 134b (for PCI expansion cards).

However, it is flash memory 116b that is associated with a predetermined address range, and enabled at power-on/reset, as in the prior art. While memory controller 138b is still designed to understand and recognize the association, such understanding and recognition is no longer necessary for system board controller 122b. Processor core 136b is still designed to start execution at power-on/reset at a predetermined address that is within this address range. Unlike the earlier embodiment, flash memory 114b is not associated with any predetermined address range, nor automatically enabled at power-on/reset.

The manner in which primary and secondary initialization instructions 108b and 106b cooperate under this embodiment of the present invention to initialize computer system 100b at power-on/reset, including the employment of the service directories and the device identifiers, will be further described later, in conjunction with the earlier embodiment, after the service directory and the identification circuit have been described.

Figures 2, 3:
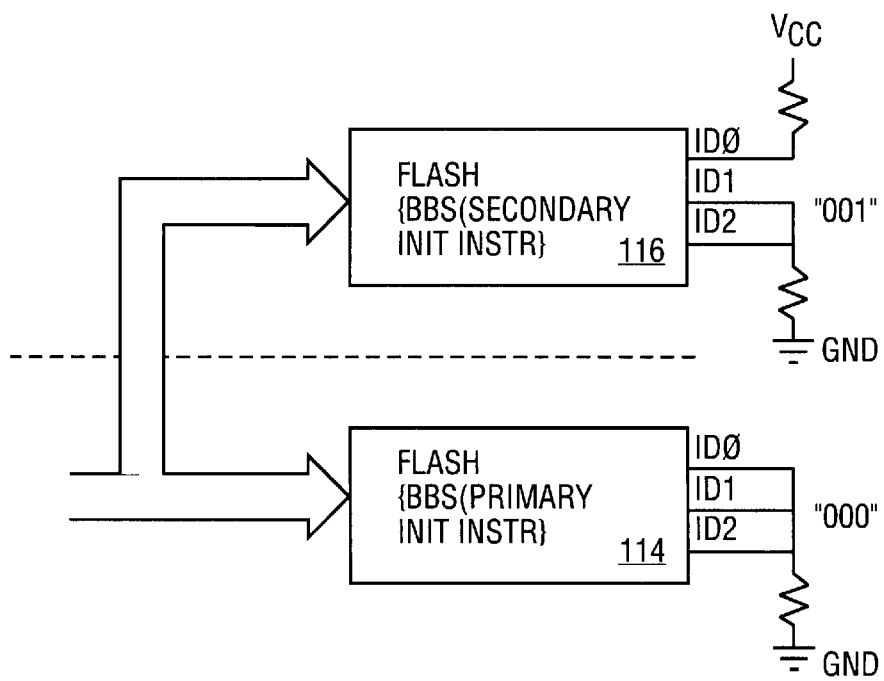
FIG. 2 illustrates a service directory stored along with the initialization instructions in a flash memory device, in accordance with one embodiment.
FIG. 3 illustrates one approach to providing identification capability to flash memory devices, in accordance with one embodiment.

FIG. 2 illustrates a service directory stored along with the initialization instructions in a flash memory device, in accordance with one embodiment. The embodiment illustrated is the service directory stored in flash memory 116a/116b of processor 102a/102b. As shown, service directory 202 includes a number of indices 204 indexing the starting locations of the various initialization supports. For the illustrated embodiment, the location addresses are derived by multiplying the index values with a predetermined constant.

Figure 4:
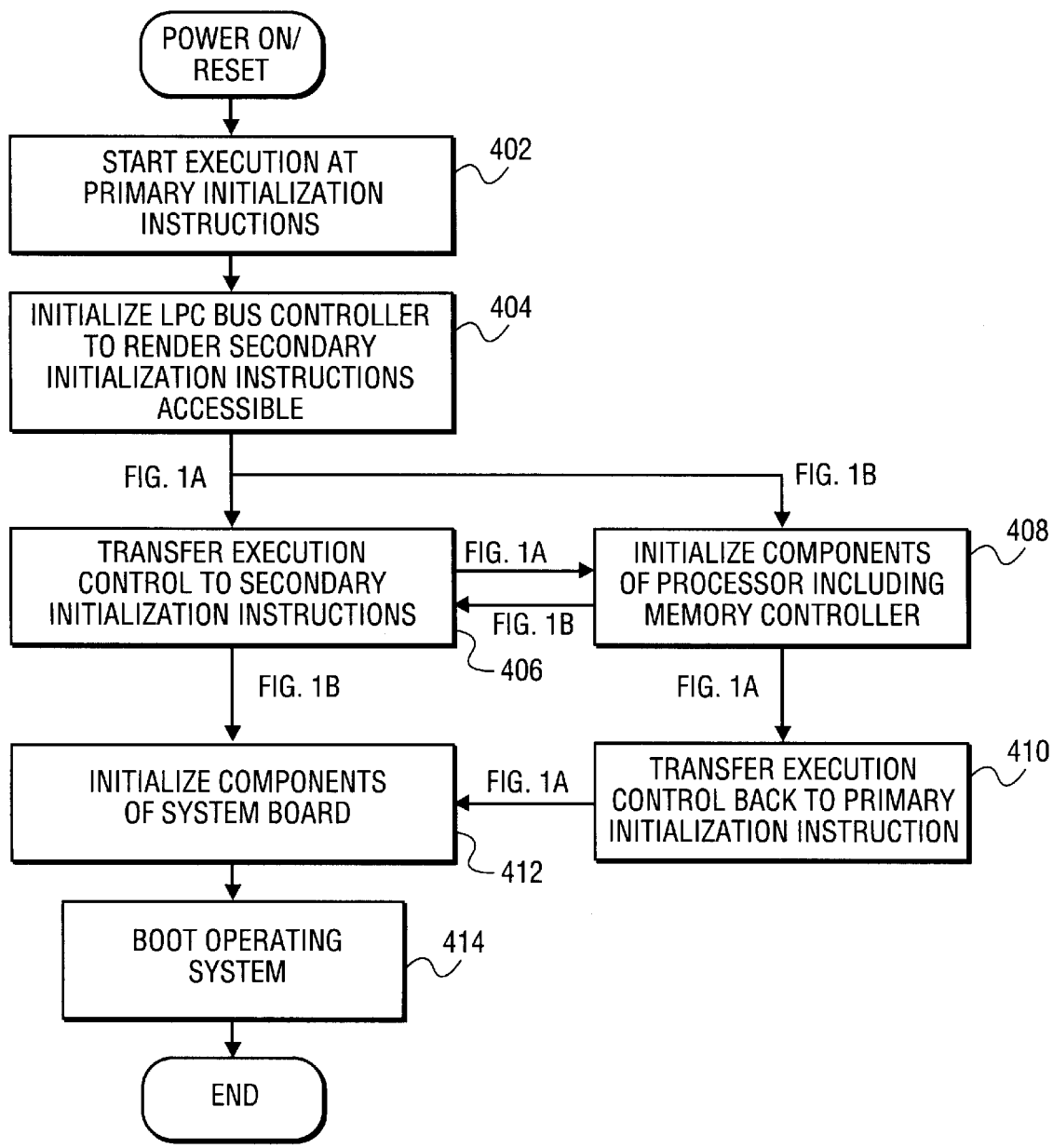
FIG. 4. illustrates the cooperative initialization process of the present invention in accordance with one embodiment.

FIG. 3 illustrates one approach to providing the identification capability to the flash memory devices, in accordance with one embodiment. As illustrated, each of the two memory devices 114 and 116 are provided with a number of externally configurable identification pins 302. Each pin may either be "strapped" to Vcc or ground, thereby allowing flash memory devices 114 and 116 to be externally configured with identification values "000" and "001" respectively. For the earlier described embodiment, flash memory device 114 strapped with identification "000" is considered to be the primary flash memory device where the primary initialization instructions are stored, where as flash memory device 116 strapped with identification "001" is considered to be the secondary flash memory device where the secondary initialization instructions are stored, FIG. 4 illustrates the manner in which the primary and secondary initialization instructions cooperate to initialize the computer system in accordance with one embodiment. FIG. 4 will be described in conjunction with FIGS. 1a–1b. Reference numbers corresponding to elements illustrated in FIGS. 1a–1b will be enclosed in parenthesis, to distinguish them from reference numbers referencing the operations illustrated in FIG. 4.

As shown, at power-on/reset, 402, by virtue of the association of the primary initialization instructions storing flash memory (114a/116b) to a predetermined address range, the recognition of the association by the memory controller (138a/138b), and if necessary, by the system board controller (122a), and the manner in which the processor core (136a/136b) starts execution, the primary initialization instructions (106a/108b) are given control. At 404, the primary initialization instructions (106a/108b) initialize the LPC bus controller (120a/120b) to render the secondary initialization instructions' storing flash memory (116a/114b) to be accessible.

For the embodiment of FIG. 1a, the process continues at 406, where execution control is transferred to the secondary initialization instructions (108a). Then, at 408, the secondary initialization instructions (108a) initialize the components of the processor (102a), e.g. the memory controller (138a), thereby making the system memory available. Upon completion, at 410, the secondary initialization instructions (108a) transfer execution control back to the primary initialization instructions (106a). Next, at 412, the primary initialization instructions (106a) initialize the components of the system board (104a), e.g. the system board controller (122a). Finally, at 414, the primary initialization instructions (106a) boot an operating system (e.g. from one of the IDE devices) to continue the system start up process.

For the embodiment of FIG. 1b, after 404, the process continues at 408 instead, where the primary initialization instructions (106b) initialize the components of the processor (102b), e.g. the memory controller (138b), thereby making the system memory available. Upon completion, the process continues at 406, where execution control is transferred to the secondary initialization instructions (106b). Next, at 412, the secondary initialization instructions (106b) initialize the components of the system board (104b), e.g. the system board controller (122b). Finally, at 414, the secondary initialization instructions (106b) boots an operating system (e.g. from one of the IDE devices) to continue the system start up process.

In alternate embodiments, various modifications may be made to the above described cooperative initialization protocol. For example, once the secondary or primary initialization instructions (106a/106b) have completed initialization of the memory controller (138a/138b), the primary and secondary initialization instructions may transfer back and forth between the two initialization instruction streams, until one of the initialization instruction stream is told by the other to boot the operating system.

In general, those skilled in the art will recognize that the present invention is not limited by the details described, instead, the present invention can be practiced with modifications and alterations within the spirit and scope of the appended claims. In particular, while for ease of understanding, the present invention has been described with the initialization instructions being distributively packaged into the processor module and the system board, the cooperative manner of initialization of the present invention may also be practiced with the initialization instructions distributed in more than two components. The description is thus to be regarded as illustrative instead of restrictive on the present invention.

Thus, a distributed approach to providing initialization support for a computer system has been disclosed.

What is claimed is:

1. A processor comprising:
   a processor core;
   at least one other electronic component; and
   a non-volatile memory device having stored therein first programming instructions that provide initialization support for the at least one other electronic component, and support for a cooperative initialization protocol under which the first programming instructions cooperate with second programming instructions of a system board on initializing a computer system formed with the processor and the system board at power-on/reset, said cooperative initialization protocol being also supported by said second programming instructions of the system board.

2. The processor of claim 1, wherein the at least one other electronic component comprises a memory controller, and the initialization support for the at least one other electronic component includes support for detecting and configuring system memory of the computer system.

3. The processor of claim 1, wherein the support for the cooperative initialization protocol includes support for transferring execution control in at least one direction between the first and second programming instructions.

4. The processor of claim 1, wherein the support for the cooperative initialization protocol includes support for booting an operating system.

5. The processor of claim 1, wherein the support for the cooperative initialization protocol includes support for making a non-volatile memory device of the system board, in which the second programming instructions are stored, accessible.

6. The processor of claim 5, wherein
the two non-volatile memory devices are correspondingly coupled to two segments of a bus;
the processor further includes the segment of the bus to which the non-volatile memory device storing the first programming instructions is coupled;
the at least one other electronic component includes a bus controller to control the bus; and
the support for making a non-volatile memory device of the system board, in which the second programming instructions are stored, accessible, includes programming the bus controller.

7. The processor of claim 6, wherein the at least one other electronic component includes a memory controller that includes the bus controller.

8. The processor of claim 6, wherein the non-volatile memory device further includes identification circuitry to supply a device identifier to uniquely identify the non-volatile memory device from other devices attached to the bus.

9. The processor of claim 1, wherein the non-volatile memory further having stored therein a data structure that can serve as a directory to the initialization support provided.

10. The processor of claim 1, wherein the at least one other electronic component includes a video controller, and the initialization support for the at least one other electronic component includes initialization support for the video controller.

11. A system board comprising:
at least one non-processor electronic component; and
a non-volatile memory device having stored therein first programming instructions that provide initialization support for the at least one non-processor electronic component, and support for a cooperative initialization protocol under which the first programming instructions cooperate with second programming instructions of a processor on initializing a computer system formed with the processor and the system board at power-on/reset, said cooperative initialization protocol being also supported by said second programming instructions of the processor.

12. The system board of claim 11, wherein the support for the cooperative initialization protocol includes support for transferring execution control in at least one direction between the first and second programming instructions.

13. The system board of claim 11, wherein the support for the cooperative initialization protocol includes support for booting an operating system.

14. The system board of claim 11, wherein the support for the cooperative initialization protocol includes support for making a non-volatile memory device of the processor, in which the second programming instructions are stored, accessible.

15. The system board of claim 14, wherein
the two non-volatile memory devices are correspondingly coupled to two segments of a bus;
the system board further includes the segment of the bus to which the nonvolatile memory device storing the first programming instructions is coupled;
the at least one non-processor electronic component includes a bus controller to control the bus; and
the support for making a non-volatile memory device of the processor, in which the second programming instructions are stored, accessible, includes programming the bus controller.

16. The system board of claim 15, wherein the at least one non-processor electronic component includes a multi-bus controller that includes the bus controller.

17. The system board of claim 15, wherein the non-volatile memory device further includes identification circuitry to supply a device identifier to uniquely identify the non-volatile memory device from other devices attached to the bus.

18. The system board of claim 11, wherein the non-volatile memory further having stored therein a data structure that can serve as a directory to the initialization support provided.

19. A computer system comprising:
a processor, including a processor core, at least one other non-processor core electronic component and a first non-volatile memory device having stored therein first programming instructions that provide initialization support for the at least one other non-processor core electronic component of the processor; and
a system board, including at least one non-processor electronic component and a second non-volatile memory device having stored therein second programming instructions that provide initialization support for the at least one non-processor electronic component of the system board;
wherein both the first and the second programming instructions further support a cooperative initialization protocol under which the first and second programming instructions cooperate with each other to initialize the computer system at power-on/reset.

20. The computer system of claim 19, wherein the at least one other electronic component of the processor comprises a memory controller, and the initialization support for the at least one other electronic component of the processor includes support for detecting and configuring system memory of the computer system.

21. The computer system of claim 19, wherein the support for the cooperative initialization protocol includes support for transferring execution control in at least one direction between the first and the second programming instructions.

22. The computer system of claim 19, wherein the joint support for the cooperative initialization protocol includes support for booting an operating system by the first/second of the programming instructions.

23. The computer system of claim 19, wherein the support for the cooperative initialization protocol includes support for making the first/second non-volatile memory device accessible.

24. The computer system of claim 23, wherein
the two non-volatile memory devices are correspondingly coupled to two segments of a bus correspondingly disposed in said processor and on said system board;
a selected one of the at least one non-processor core electronic component of the processor and the at least one non-processor electronic component of the system board includes a bus controller to control the bus; and
the support for making the first/second non-volatile memory device of the system board accessible includes programming the bus controller.

25. The computer system of claim 24, wherein the at least one non-processor core electronic component of the processor includes a memory controller that includes the bus controller.

26. The computer system of claim 24, wherein the at least one non-processor electronic component of the system board includes a multi-bus controller that includes the bus controller.

27. The computer system of claim 24, wherein each of the first and second nonvolatile memory devices further includes identification circuitry to supply a device identifier to uniquely identify the first/second non-volatile memory device from other devices attached to the bus.

28. The computer system of claim 19, wherein each of the first and second non-volatile memory devices further having stored therein a data structure that can serve as a directory to the initialization support provided by the first/second programming instructions.

29. The computer system of claim 19, wherein the at least one non-processor core electronic component includes a video controller, and the initialization support for the at least one non-processor core electronic component includes initialization support for the video controller.

* * * * *